United States Patent Office 3,591,613
Patented July 6, 1971

3,591,613
CYCLOPENTANEDICARBOXYLIC ACID DERIVATIVES
Bozidar Palameta, St. Laurent, Quebec, Canada, assignor to Ayerst, McKenna & Harrison, Limited, St. Laurent, Quebec, Canada
No Drawing. Filed Jan. 7, 1969, Ser. No. 789,617
Int. Cl. C08h 17/36
U.S. Cl. 260—413                                  5 Claims

ABSTRACT OF THE DISCLOSURE

There are disclosed herein 4-(8-carboxyoctanoyl)-5-heptanoyl-, 4-(8-carboxy-1-hydroxyoctyl)-5-(1-hydroxyheptyl)-, and 4-(8-carboxyoctyl)-5-heptyl-1,3-cyclopentanedicarboxylic acids, lower diacylates of the above dihydroxy acid, and intermediates used in the preparation of the above compounds. The compounds inhibit aldose reductase and are useful for the treatment of galactosemic cataracts. Processes for their preparation and methods for their use are also disclosed.

BACKGROUND OF THE INVENTION

This invention relates to new cyclopentanedicarboxylic acid derivatives, to processes for their preparation and to intermediates used in these processes.

The cyclopentanedicarboxylic acid derivatives of this invention have properties which render them useful compounds for the prevention and treatment of cataracts of the eye. It has now been established that high levels of hexoses lead to the accumulation of the insoluble polyols in certain tissues. Such high levels occur, for example, in galactosemia and diabetic complications. In the eye, this accumulation results in the formation of a cataract with concomitant loss of lens clarity. The pioneering investigations of J. H. Kinoshita and collaborators, see J. H. Kinoshita et al., Biochem. Biophys. Acta., 158, 472 (1968) and references cited therein, have demonstrated that aldose reductase, an enzyme capable of reducing aldoses to the corresponding alcohol, plays a central role in the etiology of galactosemic cataracts by effecting the conversion of galactose to dulcitol, and that an agent capable of inhibiting aldose reductase can prevent this detrimental accumulation of dulcitol in the lens. Accordingly, an agent that shares the properties of inhibition of aldose reductase and of low toxicity in animals would be a desirable therapeutic agent for the treatment of galactosemic cataracts. It is the purpose of this invention to disclose such useful agents.

SUMMARY OF THE INVENTION

The cyclopentanedicarboxylic acid derivatives of this invention may be represented by Formula I:

$$CH_3(CH_2)_5\underset{\underset{HOOC}{|}}{\overset{\overset{X\ \ Y}{|}}{C}}\text{—}\underset{\underset{COOH}{|}}{\overset{\overset{X\ \ Y}{|}}{C}}(CH_2)_7COOH$$

(I)

in which X and Y together represent an oxygen atom or X represents a hydrogen atom and Y represents either a hydrogen atom, a hydroxy group or a lower acyloxy group containing from 2 to 6 carbon atoms, such as, for example, an acetoxy group.

DETAILED DESCRIPTION OF THE INVENTION

The cyclopentanedicarboxylic acid derivatives of this invention have been found to possess pharmacological properties which render them useful as therapeutic agents. More particularly, these derivatives exhibit utility as agents for the prevention and treatment of galactosemic cataracts when tested on the lens of warm-blooded mammals, for example, rabbits or cattle, according to the method of J. H. Kinoshita et al., cited above.

When the cyclopentanedicarboxylic acid derivatives of this invention are employed as agents for the prevention or treatment of galactosemic cataracts in warm-blooded mammals, for example, rabbits or cattle, alone or in combination with pharmacologically acceptable carriers, the proportion of the derivative is determined by the solubility and chemical nature of the compound, chosen route of administration and standard biological practise. For example, they may be administered topically directly to the eye in the form of drops of sterile, buffered ophthalmic solutions, preferably of pH 7.2–7.6. Also, they may be administered orally in solid form containing such excipients as starch, milk sugar, certain types of clay and so forth. They may also be administered orally in the form of solutions or they may be injected parenterally. For parenteral administration they may be used in the form of a sterile solution, preferably of pH 7.2–7.6 containing a pharmaceutically acceptable buffer.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects. For topical administration a 0.5–2% solution may be administered dropwise to the eye. The frequency of installation varies with the subject under treatment form a drop every two or three days to once daily. For oral or parenteral administration a preferred level of dosage ranges from about 100 mg. to about 1.0 g. per kilo per day, although aforementioned variations will occur. However, a dosage level that is in the range of from about 200 mg. to about 500 mg. per kilo per day is most satisfactory.

The cyclopentanedicarboxylic acid derivatives of this invention may be prepared by the processes illustrated by the following formulae:

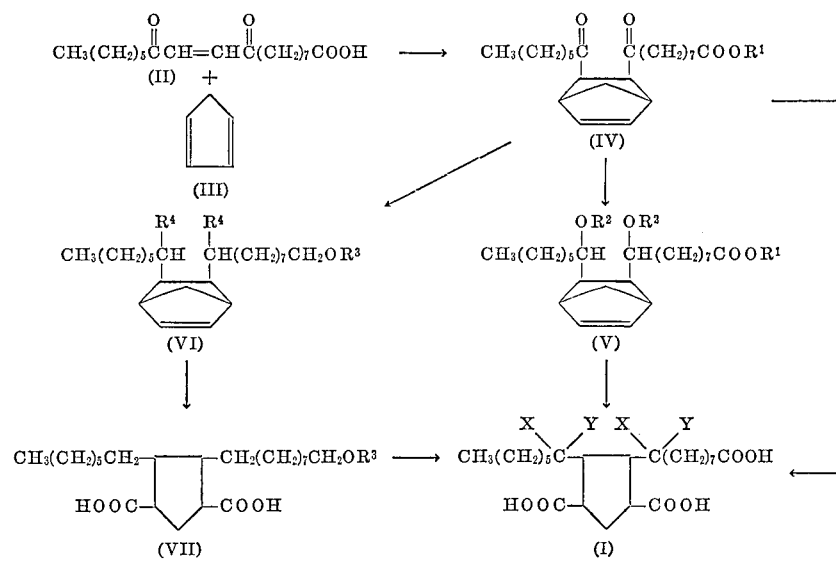

in which X and Y are as defined above, $R^1$ represents a lower alkyl group containing from 1 to 3 carbon atoms, such as, for example, a methyl group; $R^2$ represents a hydrogen atom or a lower acyl group containing from 2 to 6 carbon atoms, such as, for example, an acetyl group; $R^3$ represents a hydrogen atom or a triphenylmethyl group; and $R^4$ represents a hydrogen atom, a hydroxy group or an organosulfonyloxy group, such as, for example, a p-toluenesulfonyloxy group.

More particularly, three different preferred processes may be employed for the preparation of the cyclopentanedicarboxylic acid derivatives of this invention. The choice of the process is dependent on the nature of the group desired for the substituents X and Y for the compounds of Formula I: Process II+III→IV→I when X and Y together represent an oxygen atom, process II+III→IV→V→I when X represents hydrogen and Y represents a hydroxy group or a lower acyloxy group, and process II+III→IV→VI→VII→I when X and Y both represent hydrogen.

The diketo intermediate IV ($R^1$=H), common to the three preferred process of this invention, is conveniently prepared by a Diels-Alder reaction, see S. B. Needleman and M. C. C. Kuo, Chem. Rev., 62, 405 (1962), between 9,12-dioxo-trans-octadec-10-enoic acid (II), described by R. Kouhoupt, J. Org. Chem., 25, 1042 (1960), and cyclopentadiene (III), described by H. Tropsch et al., Ind. Eng. Chem., 30, 169 (1938). The corresponding methyl ester of Formula IV ($R^1$=$CH_3$) is readily prepared by conventional esterification methods, such as, for example, utilizing methanol in the presence of p-toluenesulfonic acid.

More specifically, for the preparation of the cyclopentanedicarboxylic acid derivative of this invention of Formula I in which X and Y together represent an oxygen atom, the diketo intermediate IV (R=H), described above, is oxidized directly with potassium permanganate to afford the compound of Formula I in which X and Y together represent an oxygen atom. Alternatively the corresponding methyl ester IV ($R^1$=$CH_3$) is similarly oxidized and the product hydrolyzed with dilute acid, such as dilute hydrochloric acid or dilute base, such as an aqueous solution of potassium carbonate, to yield the compound of Formula I in which X and Y together represent an oxygen atom.

For the preparation of the cyclopentane dicarboxylic acid derivatives of Formula I in which X represents hydrogen and Y represents a hydroxy or acyloxy group, the diketo intermediate IV (R=H), described above, is reduced with sodium borohydride to yield the dihydroxy intermediate V ($R^1$ and $R^2$=H). The latter compound is converted to its corresponding diacylate, for example, the diacetate V ($R^1$=H and $R^2$=$COCH_3$), and then oxidized with potassium permanganate to yield the pentanedicarboxylic acid derivative of Formula I in which X represents a hydrogen atom and Y represents an acetyl group. Hydrolysis with dilute acid or base, as described above afforded the cyclopentanedicarboxylic acid derivative of Formula I in which X represents a hydrogen atom and Y represents a hydroxy group. In the latter process both the dihydroxy intermediate V ($R^1$ and $R^2$=H) and the diacetate V ($R^1$=H and $R^2$=$COCH_3$) are characterized further as their corresponding methyl esters, compounds V ($R^1$=$CH_3$ and $R^2$=H) and V ($R^1$=$CH_3$ and $R^2$=$COCH_3$), respectively.

Alternatively, the cyclopentanedicarboxylic acid derivative of Formula I in which X represents a hydrogen atom and Y represents a hydroxy group may be obtained by sodium borohydride reduction of the compound of Formula I (X and Y together=O), prepared as described above.

Finally, the cyclopentanedicarboxylic acid derivatives of Formula I in which both X and Y represent hydrogen may be prepared as follows: The diketo intermediate IV ($R^1$=H), described above, is reduced with lithium aluminum hydride to afford the triol VI ($R^3$=H and $R^4$=OH). The latter compound is treated with triphenylchloromethane in pyridine solution to afford the ether VI ($R^3$=triphenylmethyl and $R^4$=OH), which is converted to its corresponding di-p-toluenesulfonate VI ($R^3$=triphenylmethyl and $R^4$=p-toluenesulfonyloxy). Said di-p-toluenesulfonate is reduced with lithium aluminum hydride to afford the olefinic trimethylphenyl ether VI ($R^3$=triphenylmethyl and $R^4$=H). Subsequent oxidation with potassium permanganate yields dicarboxylic triphenylmethyl ether VII ($R^3$=triphenylmethyl) which on treatment with aqueous acetic acid yields the corresponding free hydroxy derivative VII ($R^3$=H). The latter compound is readily oxidized with potassium permanganate to the cyclopentanedicarboxylic acid derivative of Formula I in which X and Y both represent hydrogen.

The following examples will illustrate this invention.

EXAMPLE 1

2-(8-carboxyoctanoyl)-3-heptanoyl-bicyclo[2,2,1] hept-5-ene (IV, $R^1$=H)

A suspension of 29.3 g. of 9,12-dioxo-trans-10-octadecenoic acid in 10 ml. of anhydrous benzene containing 7 g. (10% excess) of freshly distilled cyclopentadiene is left, with occasional shaking, for 24 hours at 25°. The clear solution is evaporated to dryness yielding the title compound as a colorless oil $\lambda_{max.}^{CHCl_3}$ 1710 cm.$^{-1}$. The oil gives a single spot, $R_f=0.4$, on T.L.C. ($SiO_2$-petroleum ether:ether:acetic acid::60:40:4).

*Analysis.*—Calc'd for $C_{23}H_{26}O_4$ (percent): C, 73.36; H, 9.64. Found (percent): C, 73.45; H, 9.45.

EXAMPLE 2

2-(8-carbomethoxyoctanoyl)-3-heptanoyl-bicyclo[2,2,1]hept-5-ene (IV, $R^1=CH_3$)

2-(8-carboxyoctanoyl) - 3 - heptanoyl - bicyclo[2,2,1]hept-5-ene, prepared as described in Example 1, 200 mg., dissolved in 50 ml. of anhydrous methanol containing 50 mg. of p-toluenesulfonic acid, is allowed to stand at room temperature for 24 hours. The reaction mixture is diluted with chloroform and washed with 10% sodium carbonate solution and water. The chloroform extract is dried ($Na_2SO_4$), filtered and evaporated to dryness to afford the title compound as a yellowish oil, $\lambda_{max.}^{CHCl_3}$ 1725, 1700 cm.$^{-1}$. The oil gives a single spot, $R_f=0.7$, on T.L.C. ($SiO_2$-chloroform:ether::9:1).

*Analysis.*—Calc'd for $C_{24}H_{38}O_4$ (percent): C, 73.80; H, 9.81. Found (percent): C, 73.30; H, 9.41.

EXAMPLE 3

4-(8-carboxyoctanoyl)-5-heptanoyl-1,3-cyclopentanedicarboxylic acid (I, X, and Y together=O)

Method A.—To a stirred solution of 5 g. of 2-(8-carboxyoctanoyl)-3-heptanoyl-bicyclo[2,2,1]hept-5-ene, prepared as described in Example 1, in 80 ml. of glacial acetic acid, finely powdered potassium permanganate is added in small portions (a total of 8 g.) during two hours at 25° C. After an additional two hours of stirring, excess permanganate is destroyed with aqueous sodium bisulfite and 10% sulfuric acid and the whole reaction mixture is poured onto ice and water. A thick oily precipitate separates. The oil is dissolved in ether and washed successively with sodium bisulfite solution and water. The organic layer is dried over anhydrous sodium sulfate and evaporated under reduced pressure. Traces of acetic acid are removed by coevaporation with toluene. The title compound is obtained as a yellowish oil, which is purified by preparative T.L.C.; $R_f=0.4$ ($SiO_2$-petroleum ether:ether:acetic acid::40:60:6).

*Analysis.*—Calc'd for $C_{23}H_{36}O_8$ (percent): C, 62.71; H, 8.24. Found (percent): C, 63.74; H, 8.19.

The title compound is further characterized by conversion to its corresponding methyl triester by the procedure described in Example 2. The triester is purified by preparative T.L.C. ($SiO_2$-chloroform:ether::50:1); N.M.R. spectrum in $CDCl_3$ shows the expected bands for the methyl groups of the esters at 218, 220 and 223 c.p.s.

Method B.—In the same manner as described in Method A, but using an equivalent amount of 2-(8-carbomethoxyoctanyl)-3 - heptanoyl - bicyclo[2,2,1]hept-5-ene, described in Example 2, instead of 2-(8-carboxyoctanyl)-3-heptanoyl-bicyclo[2,2,1]hept-5-ene, followed by treatment with 10% aqueous hydrochloric acid in methanol solution, the title compound identical with the product obtained by Method A, is obtained.

EXAMPLE 4

2-(8-carboxy-1-hydroxyoctyl)-3-(1-hydroxyheptyl)-bicyclo[2,2,1]hept-5-ene (V, $R^1$ and $R^2=H$)

To a solution of 2.2 g. of 2-(8-carboxyoctanoyl)-3-heptanoyl-bicyclo[2,2,1]hept-5-ene, prepared as described in Example 1, in 20 ml. of ethanol, 2 g. of sodium borohydride in 50 ml. of ethanol is added dropwise during 10 minutes. After another 30 minutes at 25°, excess 10% hydrochloric acid is added and the organic solvent removed under reduced pressure. The residue is diluted with water, extracted with ether and the ether extract dried over anhydrous sodium sulfate. Evaporation of the dried ether extract affords the title compound $\lambda_{max.}^{CHCl_3}$ 3400, 1710, 1130 and 1100 cm.$^{-1}$.

The corresponding methyl ester of the title compound is obtained by treating the title compound with anhydrous methanol and p-toluenesulfonic acid according to the procedure described in Example 2. The methyl ester has $\lambda_{max.}^{CHCl_3}$ 3400, 1730, 1225 and 1040 cm.$^{-1}$.

*Analysis.*—Calc'd for $C_{24}H_{42}O_4$ (percent): C, 73.05; H, 10.73. Found (percent): 73.18; H, 10.59.

EXAMPLE 5

2-(8-carboxy-1-acetoxyoctyl)-3-(1-acetoxyheptyl)-bicyclo[2,2,1]hept-5-ene (V, $R^1=H$ and $R^2=COCH_3$)

A solution of 2-(8-carboxy-1-hydroxyoctyl)-3-(1-hydroxyheptyl)-bicyclo[2,2,1]hept-5-ene, prepared as described in Example 4, 1.0 g., in 50 ml. of pyridine is treated with 5 ml. of acetic anhydride at 25° C. for 18 hours. The reaction mixture is poured into dilute hydrochloric acid and extracted with ether. The ether extract is washed with dilute hydrochloric acid, water, dried over sodium sulfate, filtered and evaporated under reduced pressure to afford the title compound as an oil, $\lambda_{max.}^{CHCl_3}$ 1720, 1240 and 1020 cm.$^{-1}$, $R_f=0.6$ ($SiO_2$-petroleum ether:ether:acetic acid::40:60:6).

*Analysis.*—Calc'd for $C_{27}H_{44}O_6$ (percent): C, 69.79; H, 9.55. Found (percent): C, 69.50; H, 9.31.

The corresponding methyl ester of the title compound is obtained by treating the title compound with anhydrous methanol and p-toluenesulfonic acid according to the procedure described in Example 2. The methyl ester has $\lambda_{max.}^{CHCl_3}$ 1725, 1460, 1435, 1370, 1250, 1220, 1110 and 1020 cm.$^{-1}$.

*Analysis.*—Calc'd for $C_{28}H_{46}O_6$ (percent): C, 70.26; H, 9.69. Found (percent): C, 70.87; H, 9.50.

EXAMPLE 6

4-(8-carboxy-1-acetoxyoctyl) - 5-(1-acetoxyheptyl)-3-cyclopentanedicarboxylic acid (I, X=H and Y=OCOCH_3)

Using the procedure described in Example 3, Method A, but using an equivalent amount of 2-(8-carboxy-1-acetoxyoctyl)-3-(1-acetoxyheptyl) - bicyclo[2,2,1]hept-5-ene, prepared as described in Example 5, instead of 2-(8-carboxyoctanoyl)-3-heptanoyl - bicyclo[2,2,1]hept-5-ene, the title compound, $\lambda_{max.}^{CHCl_3}$ 3000, 1725, 920 cm.$^{-1}$, is obtained.

EXAMPLE 7

4-(8-carboxy-1-hydroxyoctyl)-5-(1-hydroxyheptyl)-1,3-cyclopentanedicarboxylic acid (I, X=H and Y=OH)

Method A.—A mixture of 4 - (8 - carboxy-1-acetoxyoctyl) - 5 - (1 - acetoxyheptyl) - 1,3 - cyclopentanedicarboxylic acid, prepared as described in Example 6, 0.5 g., in 95 ml. of methanol and 5 ml. of 10% potassium hydroxide solution is boiled for 30 minutes. The cooled reaction mixture is diluted with water, neutralized by the careful addition of 10% hydrochloric acid and extracted with ether. The extract is dried over sodium sulfate, filtered and evaporated to yield the title compound, $\lambda_{max.}^{CHCl_3}$ 3400, 1720, 1710 cm.$^{-1}$.

Method B.—Using the procedure described in Example 4, but using an equivalent amount of 4-(8-carboxyoctanoyl)-5-heptanoyl - 1,3 - cyclopentanedicarboxylic acid, prepared as described in Example 3, instead of 2-(8-carboxyoctanoyl) - 3 - heptanoyl - bicyclo[2,2,1]hept - 5-ene, the title compound is also obtained.

EXAMPLE 8

2-(1,9-dihydroxynonyl)-3-(1-hydroxyheptyl)-bicyclo [2,2,1]hept-5-ene (VI, R$^3$ and R$^4$=H)

A solution of 2-(8-carboxyoctanoyl)-3-heptanoylbicyclo[2,2,1]hept-5-ene, prepared as described in Example 1, in 60 ml. of anhydrous ether is added dropwise to 5 g. of lithium aluminum hydride in 350 ml. of anhydrous ether. The mixture is refluxed with stirring for two hours. Excess hydride is destroyed with water and enough 10% sulfuric acid was added to dissolve the complex. The ether layer is washed with water, with 10% sodium hydroxide and finally with water, dried over anhydrous sodium sulfate and evaporated under reduced pressure to yield the title compound as a yellowish oil which is crystallized on standing. Recrystallation of the crude product from ether affords the title compound, M.P. 129–130.5° C., $\lambda_{max.}^{CHCl_3}$ 3600, 3400, 1050 cm.$^{-1}$.

EXAMPLE 9

2 - (1 - hydroxy - 9 - triphenylmethoxynonyl) - 3 - (1-hydroxyheptyl) - bicyclo[2,2,1]hept - 5 - ene (VI, R$_3$=triphenylmethyl and R$^4$=OH)

A solution of 7.1 g. of 2-(1,9-dihydroxynonyl)-3-(1-hydroxylheptyl)-bicyclo[2,2,1]hept-5-ene, the crude product described in Example 8, is treated with 7.0 g. of triphenylchloromethane in 50 ml. of pyridine for 48 hours at room temperature. The reaction mixture is poured onto 500 ml. of ice and water and allowed to stand for 30 minutes with occasional shaking. The thick oily precipitate is dissolved in ether, washed with ice-cold 5% sulfuric acid, with water and finally with saturated sodium bicarbonate solution. The solution is dried over anhydrous sodium sulfate and evaporated under reduced pressure. Column chromatography (using benzene and then chloroform as eluants) is used to remove triphenyl chloromethane and triphenylmethanol. The title compound is obtained on further elution with chloroform as an almost colorless oil, $\lambda_{max.}^{CHCl_3}$ 3600–3400, 3050, 1600, 1500, 1075 and 700 cm.$^{-1}$. The product may be used without further purification (see Example 10).

EXAMPLE 10

2-(9-triphenylmethoxynonyl)-3-heptyl-bicyclo[2,2,1] hept-5-ene (VI, R$^3$=triphenylmethyl and R$^4$=H)

A solution of 11.0 g. of 2-(1-hydroxy-9-triphenylmethoxynonyl) - 3 - (1 - hydroxyheptyl) - bicyclo[2,2,1]hept-5-ene, the product described in Example 9, is treated with four equivalents of p-toluenesulfonyl chloride in 50 ml. of pyridine overnight at room temperature. The crude product is isolated by the same isolation procedure described in Example 9.

Using the same isolation procedure described in Example 9, the corresponding di-p-toluenesulfonate of the above starting material is obtained. The di-p-toluenesulfonate is reduced directly with lithium aluminum hydride in the manner described for the reduction of 2-(8-carboxyoctanoyl) - 3 - heptanoyl - bicyclo[2,2,1]hept-5-ene, described in Example 8, to yield the title compound. The title compound is purified by column chromatography. Elution with petroleum ether-benzene (1:1) yields the purified title compound, R$_f$=0.5 (SiO$_2$-petroleum ether:benzene::3:1).

*Analysis.*—Calc'd for C$_{42}$H$_{56}$O (percent): C, 87.44; H, 9.79. Found (percent): C, 87.06; H, 9.48.

The infrared spectrum of the title compound in CHCl$_3$ shows the usual aromatic, paraffinic and ether bands and has no hydroxy band in the 3300–3600 cm.$^{-1}$ region. The N.M.R. spectrum of the title compound in CDCl$_3$ has the expected aromatic multiplet centered at 435 c.p.s. (15 protons), olefinic broad signal around 360 c.p.s. (2 protons) and a triplet at 184 c.p.s. (2 protons of CH$_2$O-triphenylmethyl).

EXAMPLE 11

4-(9-triphenylmethoxynonyl)-5-heptyl-1,3-cyclopentanedicarboxylic acid (VII, R$^3$=triphenylmethyl)

2 - (9 - triphenylmethoxynonyl) - 3 - heptyl - bicyclo [2,2,1]hept-5-ene, prepared as described in Example 10, 21 g. is treated with 18 g. of potassium permanganate in 250 ml. of acetic acid at 25° C. in the manner described in Example 3. The title compound is obtained as a brownish oil, $\lambda_{max.}^{CHCl_3}$ 3300–3000, 1710, 1590, 1480 and 1060 cm.$^{-1}$.

The title compound is further characterized by conversion of a portion of the product to its corresponding dimethyl ester by treatment with diazomethane. The dimethyl ester in purified by preparative T.L.C. (SiO$_2$-chloroform: ether::50:1). The N.M.R. spectrum in CDCl$_3$ of the diester shows a multiplet around 435 c.p.s., a doublet at 220 c.p.s., a triplet around 183 c.p.s. and several bands around 130 c.p.s.

EXAMPLE 12

4-(9-hydroxynonyl)-5-heptyl-1,3-cyclopentanecarboxylic acid (VII, R$^3$=H)

4 - (9 - triphenylmethoxyonyl) - 5 - heptyl - 1,3 - cyclopentanedicarboxylic acid, prepared as described in Example 11, 9.3 g. is refluxed for two hours with 50 ml. of 90% acetic acid. The bulk of triphenyl-methanol crystallizes from the cooled reaction mixture and is removed by filtration. The filtrate is evaporated to dryness to yield the title compound as an oil, $\lambda_{max.}^{CHCl_3}$ 3300–3100, 1710 and 1055 cm.$^{-1}$.

The title compound is further characterized by conversion of a portion of the product to its corresponding dimethyl ester by treatment with p-toluenesulfonic acid and anhydrous methanol using the procedure described in Example 2. The dimethyl ester is purified by preparation TLC, R$_f$=0.6 (SiO$_2$-chloroform:ether::3:1), $\lambda_{max.}^{CHCl_3}$ 3450, 1735, 1200, 1160 and 1050 cm.$^{-1}$.

*Analysis.*—Calc'd for C$_{25}$H$_{46}$O$_5$ (percent): C, 70.38; H, 10.87. Found (percent): C, 69.93; H, 10.58.

EXAMPLE 13

4-(8-carboxyoctyl)-5-heptyl-1,3-cyclopentanedicarboxylic acid (I, X and Y-H)

Using the procedure described in Example 3, Method A, but using an equivalent amount of 4-(9 - hydroxynonyl)-5-heptyl-1,3 - cyclopentanedicarboxylic acid, prepared as described in Example 12, instead of 2-(8-carboxyoctanoyl)-3 - heptanoylbicyclo[2,2,1]hept - 5 - ene, the title compound, $\lambda_{max.}^{CHCl_3}$ 3300–3000 and 1050 cm.$^{-1}$, is obtained.

I claim:
1. A compound selected from those of the formula

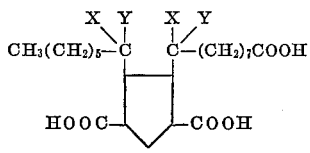

wherein X and Y together represent an oxygen atom; or X represents a hydrogen atom and Y is selected from the group which consists of hydrogen, hydroxy and lower acyloxy containing from two to six carbon atoms.

2. 4 - (8 - carboxyoctanoyl) - 5-heptanoyl-1,3-cyclopentanedicarboxylic acid, as claimed in claim 1.

3. 4 - (8 - carboxy - 1 - acetoxyoctyl)-5-(1-acetoxyheptyl)-1,3-cyclopentanedicarboxylic acid, as claimed in claim 1.

4. 4 - (8 - carboxy - 1 - hydroxyoctyl)-5-(1-hydroxyheptyl)-1,3-cyclopentanedicarboxylic acid, as claimed in claim 1.

5. 4 - (8 - carboxyoctyl) - 5-heptyl-1,3-cyclopentanedicarboxylic acid, as claimed in claim 1.

References Cited

Chem. Abstracts 66:10623c.
Chem. Abstracts 70:P67734f.
Chem. Abstracts 69:2543c.

ELBERT L. ROBERTS, Primary Examiner

E. G. LOVE, Assistant Examiner

U.S. Cl. X.R.

260—410.9, 611, 617; 424—318, 339, 343